(12) United States Patent
Mahe et al.

(10) Patent No.: US 7,445,259 B1
(45) Date of Patent: Nov. 4, 2008

(54) FASCIA ANTI-RATTLE SPRINGS

(75) Inventors: Vince R. Mahe, South Lyon, MI (US);
Irfan Sharif, Canton, MI (US); Dan L. Scalici, Clinton Township, MI (US);
Geoff Brooks, Macomb, MI (US); Gary W. Deering, Ashley, IL (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/760,332

(22) Filed: Jun. 8, 2007

(51) Int. Cl.
*B60R 19/02* (2006.01)
(52) U.S. Cl. ...................... 293/102; 293/120
(58) Field of Classification Search ............ 296/187.09, 296/203.02; 293/120, 102
See application file for complete search history.

(56) References Cited

U.S. PATENT DOCUMENTS

| | | | | |
|---|---|---|---|---|
| 3,836,188 | A | * | 9/1974 | Klees .......................... 293/120 |
| 3,926,462 | A | * | 12/1975 | Burns et al. .................. 293/136 |
| 3,926,463 | A | * | 12/1975 | Landwehr et al. ........... 293/136 |
| 4,966,245 | A | | 10/1990 | Pfister |
| 5,108,138 | A | * | 4/1992 | Kawaguchi .................. 293/120 |
| 5,169,189 | A | | 12/1992 | Häberle et al. |
| 5,267,128 | A | * | 11/1993 | Shamir et al. ............... 362/505 |
| 5,577,784 | A | * | 11/1996 | Nelson ........................ 293/120 |
| 5,580,109 | A | | 12/1996 | Birka et al. |
| 5,957,512 | A | * | 9/1999 | Inada et al. .................. 293/102 |
| 6,022,057 | A | | 2/2000 | Vermeulen |
| 6,322,115 | B1 | | 11/2001 | Devilliers |
| 6,435,579 | B1 | * | 8/2002 | Glance ........................ 293/102 |
| 6,536,818 | B1 | | 3/2003 | Moss |
| 6,663,150 | B1 | * | 12/2003 | Evans .......................... 293/120 |
| 6,688,675 | B2 | | 2/2004 | Polzer et al. |
| 6,736,434 | B2 | * | 5/2004 | Anderson et al. ........... 293/102 |
| 6,755,459 | B2 | * | 6/2004 | Thelen et al. ............... 293/120 |
| 6,908,127 | B2 | | 6/2005 | Evans |
| 6,926,323 | B2 | | 8/2005 | Evans |
| 6,949,209 | B2 | * | 9/2005 | Zander et al. .................. 264/51 |
| 7,252,312 | B1 | * | 8/2007 | Shen et al. ................... 293/115 |
| 7,410,018 | B2 | * | 8/2008 | Satou .......................... 293/121 |
| 2007/0080009 | A1 | * | 4/2007 | Kowalski .................... 180/68.6 |
| 2007/0240934 | A1 | * | 10/2007 | Van de Flier et al. ........ 181/252 |

* cited by examiner

*Primary Examiner*—Kiran B. Patel
(74) *Attorney, Agent, or Firm*—Greg P. Brown; Dykema Gossett PLLC

(57) ABSTRACT

An automobile bumper system including an isolator disposed adjacent a cross beam of an automobile frame, and a fascia disposed adjacent the isolator to substantially cover the isolator. A plurality of fascia support anti-rattle springs may be mounted to the isolator and disposable in contiguous engagement with the fascia for maintaining the fascia adjacent the isolator in a fascia predetermined position and further biasing the fascia away from the isolator to the fascia predetermined position. The fascia support anti-rattle spring may include an end mounted to the isolator and an engagement detent for contiguously engaging the fascia and thereby biasing the fascia away from the isolator to the fascia predetermined position.

21 Claims, 7 Drawing Sheets

FASCIA ANTI-RATTLE SPRINGS

BACKGROUND OF INVENTION a. Field of Invention

The invention relates generally to vehicle structural design, and more particularly, to the structural design of a vehicle bumper system for maximizing the structural rigidity of the bumper system and concurrently minimizing potential rattling thereof.

b. Description of Related Art

As is known in the art, automobiles include a variety of structural components whose design is governed by a variety of performance factors, some of which are related to maximizing the structural rigidity and minimizing potential rattling of the components. For modern bumper systems used with body-on-frame vehicles, such performance requirements are generally met by use an anti-rattle foam layer taped between an isolator and outer fascia layer, with the isolator being affixed to the vehicle frame. Due to build variations, the foam layer is often used on a need-only basis in certain areas. Moreover, even if the foam layer is uniformly disposed between the isolator and outer fascia layer, build variations in these or other related components can result in unintended gaps and thus undesirable rattling of components.

As readily evident to those skilled in the art, application of the foam layer in a uniform and especially on a need-only basis significantly adds to the manufacturing cost associated with a vehicle. Moreover, any components which may rattle upon delivery to a customer can be ascertained as the build quality of a vehicle.

In the art, U.S. Pat. Nos. 5,108,138 to Kawaguchi, 5,957, 512 to Inada and 6,663,150 to Evans are exemplary of other known bumper systems. While these designs aim to maximize the structural rigidity and minimize potential rattling of bumper components, the use and effectiveness thereof is however limited due to the drawbacks discussed below.

For example, Kawaguchi, as illustrated in FIG. 1 thereof, provides for a bumper structure including plastic bumper fascia (58) extending laterally for covering bumper reinforce (34). Bumper fascia (58) includes at its upper rear end portion a grooved portion (60) for fixedly receiving forwardly bent portion (42) of bumper reinforce (34). Bumper fascia (58) includes at its laterally extending middle portion a larger platelike flange (62) and two smaller platelike flanges (64) which are positioned laterally beside larger flange (62). Larger flange (62) has larger base portion (66) formed of an isosceles trapezoidal shape and rectangular smaller portion (68) which has rectangular opening (70) formed therethrough, with opening (70) being sized to receive engaging portion (48) of bumper reinforce (34). Thus whereas Kawaguchi provides a method of attachment of bumper fascia (58) to bumper reinforce (34), from a manufacturing viewpoint, components such as engaging portion (48) and its associated flanges (46, 50) significantly add to the overall manufacturing and design costs associated with a vehicle, as well as the overall design complexity for such components. Moreover, these components must be uniquely designed and manufactured for each particular fascia design, and therefore do not present a cost-effective bumper structure from a design and manufacturing perspective.

Referring next to Inada, FIG. 13 of Inada discloses a bumper assembly having an energy absorbing member for absorbing impact energy. Energy absorbing member (28) is accommodated into bumper face (11) in a position opposed to bumper beam (27) which is fixed onto a vehicle body side. Bumper face (11) and energy absorbing member (28) are integrally fixed to each other by tapping screw (29), and energy absorbing member (28) appears to be adhesively or otherwise fixed to bumper beam (27). Thus whereas Inada provides a bumper attachment which uses tapping screws (29) for attaching bumper face (11) to energy absorbing member (28), this attachment method is however limited in application due to the use of screws (29) provided for preventing rattling of bumper face (11), with potential gaps still present between bumper face (11) and energy absorbing member (28). Further, the attachment of energy absorbing member (28) to bumper beam (27) requires yet a further manufacturing step for assembly of the Inada bumper system.

Lastly, Evans, as shown in FIGS. 2-4 thereof, discloses a bumper with an integrated energy absorber (22) including horizontal upper and lower rails (34) and (35), each having rearwardly-facing U-shaped cross sections. Upper rail (34) defines a large portion of rearwardly-facing recess (25), which is shaped to receive the center tubular section of beam (21). Box-shaped sections (33) are molded along rail (34) at strategic locations and have an upper surface shaped to support vehicle front fascia (36). Legs (35') extend below lower rail (35) for supporting a bottom of the fascia on a front of the vehicle, and attachment of the fascia by means of screws and the like (see FIGS. 3 and 4). Energy absorber (22) has reinforcing walls (55) with top wall (56) shaped to structurally support portions of a fascia in the area of a vehicle front fender. Thus whereas Evans, in a similar manner as Inada, discloses an attachment method for a bumper fascia, this attachment method is likewise limited in application due to the use of screws (see FIG. 3) for preventing rattling of fascia (36), with potential gaps still present between the fascia and energy absorber (22).

It is therefore desirable to provide a bumper system which provides a cost-effective means for minimizing or eliminating rattling of components, such as the outer fascia and the isolator. It is also desirable to provide a bumper system which is simple to design and manufacture, and which is readily tunable for a variety of bumper designs.

SUMMARY OF THE INVENTION

The invention solves the problems and overcomes the drawbacks and deficiencies of prior art bumper designs by providing an automobile bumper system including an isolator disposed adjacent a cross beam of an automobile frame, and a fascia disposed adjacent the isolator to substantially cover the isolator. One or more fascia support anti-rattle springs may be mounted to the isolator and be disposable in contiguous engagement with the fascia for maintaining the fascia adjacent the isolator in a fascia predetermined position and further biasing the fascia away from the isolator to the fascia predetermined position. The fascia support anti-rattle spring may include an end mounted to the isolator and an engagement detent for contiguously engaging the fascia and thereby biasing the fascia away from the isolator to the fascia predetermined position.

For the automobile bumper system described above, the system may further include one or more cross beam support anti-rattle springs mounted to the isolator and disposable in contiguous engagement with the cross beam for maintaining the isolator adjacent the cross beam in an isolator predetermined position and further biasing the isolator away from the cross beam to the isolator predetermined position. The fascia and cross beam support anti-rattle springs may include a further detent between the engagement detent and the end mounted to the isolator for maintaining the fascia and cross beam support anti-rattle springs in a predetermined biased configuration respectively relative to the fascia and the cross beam. In particular embodiments, the engagement and further detents may respectively include concave and convex configurations. The fascia and/or cross beam support anti-rattle springs may be integrally formed with the isolator. In a particular embodiment, the fascia support anti-rattle spring may be provided on an upper surface of the isolator for contiguously engaging the fascia. The cross beam support anti-rattle spring may be provided on a lower surface of the isolator for contiguously engaging the cross beam. Further, in a particular embodiment, the fascia support anti-rattle spring may include a lead-in section for facilitating movement of the fascia relative to the isolator, the lead-in section being pointed in a direction away from a fascia biasing direction. Likewise, the cross beam support anti-rattle spring may include a lead-in section for facilitating movement of the isolator relative to the cross beam, the lead-in section being pointed in a direction toward an isolator biasing direction.

The invention also provides an automobile bumper system including an isolator disposable adjacent a cross beam of an automobile frame, and a fascia disposable adjacent the isolator. One or more fascia support anti-rattle springs may be mounted to the isolator and be disposable in contiguous engagement with the fascia for maintaining the fascia adjacent the isolator in a fascia predetermined position and further biasing the fascia away from the isolator to the fascia predetermined position. The fascia support anti-rattle spring may include an end mounted to the isolator and an engagement detent for contiguously engaging the fascia and thereby biasing the fascia away from the isolator to the fascia predetermined position.

For the automobile bumper system described above, the system may further include one or more cross beam support anti-rattle springs mounted to the isolator and disposable in contiguous engagement with the cross beam for maintaining the isolator adjacent the cross beam in an isolator predetermined position and further biasing the isolator away from the cross beam to the isolator predetermined position. The fascia and cross beam support anti-rattle springs may include a further detent between the engagement detent and the end mounted to the isolator for maintaining the fascia and cross beam support anti-rattle springs in a predetermined biased configuration respectively relative to the fascia and the cross beam. In particular embodiments, the engagement and further detents may respectively include concave and convex configurations. The fascia and/or cross beam support anti-rattle springs may be integrally formed with the isolator. In a particular embodiment, the fascia support anti-rattle spring may be provided on an upper surface of the isolator for contiguously engaging the fascia. The cross beam support anti-rattle spring may be provided on a lower surface of the isolator for contiguously engaging the cross beam. Further, in a particular embodiment, the fascia support anti-rattle spring may include a lead-in section for facilitating movement of the fascia relative to the isolator, the lead-in section being pointed in a direction away from a fascia biasing direction. Likewise, the cross beam support anti-rattle spring may include a lead-in section for facilitating movement of the isolator relative to the cross beam, the lead-in section being pointed in a direction toward an isolator biasing direction.

The invention yet further provides an automobile bumper system including an isolator disposable adjacent a cross beam of an automobile frame, and a fascia disposable adjacent the isolator. One or more cross beam support anti-rattle springs may be mounted to the isolator and be disposable in contiguous engagement with the cross beam for maintaining the isolator adjacent the cross beam in an isolator predetermined position and further biasing the isolator away from the cross beam to the isolator predetermined position. The cross beam support anti-rattle spring may include an end mounted to the isolator and an engagement detent for contiguously engaging the cross beam and thereby biasing the isolator away from the cross beam to the isolator predetermined position.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENTS

Figure 1:
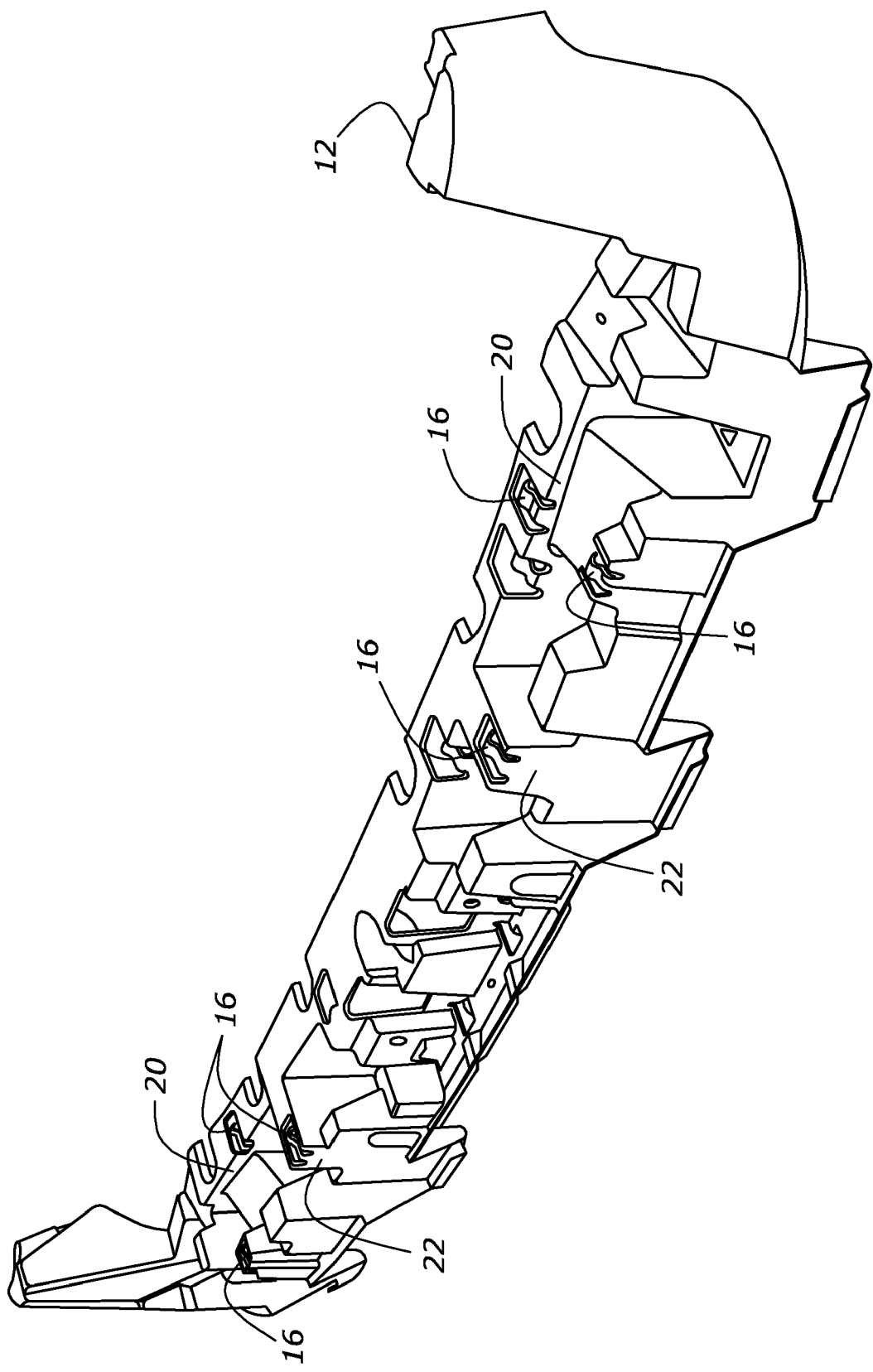
FIG. 1 is an isometric view of an isolator for use with a bumper system according to the present invention, illustrating anti-rattle springs for supporting a top of a fascia and illustrating the front of the isolator.

Referring now to the drawings wherein like reference numerals designate corresponding parts throughout the several views, FIGS. 1-7 illustrate various views of a bumper system according to the present invention (generally designated "bumper system 10").

Figure 2:
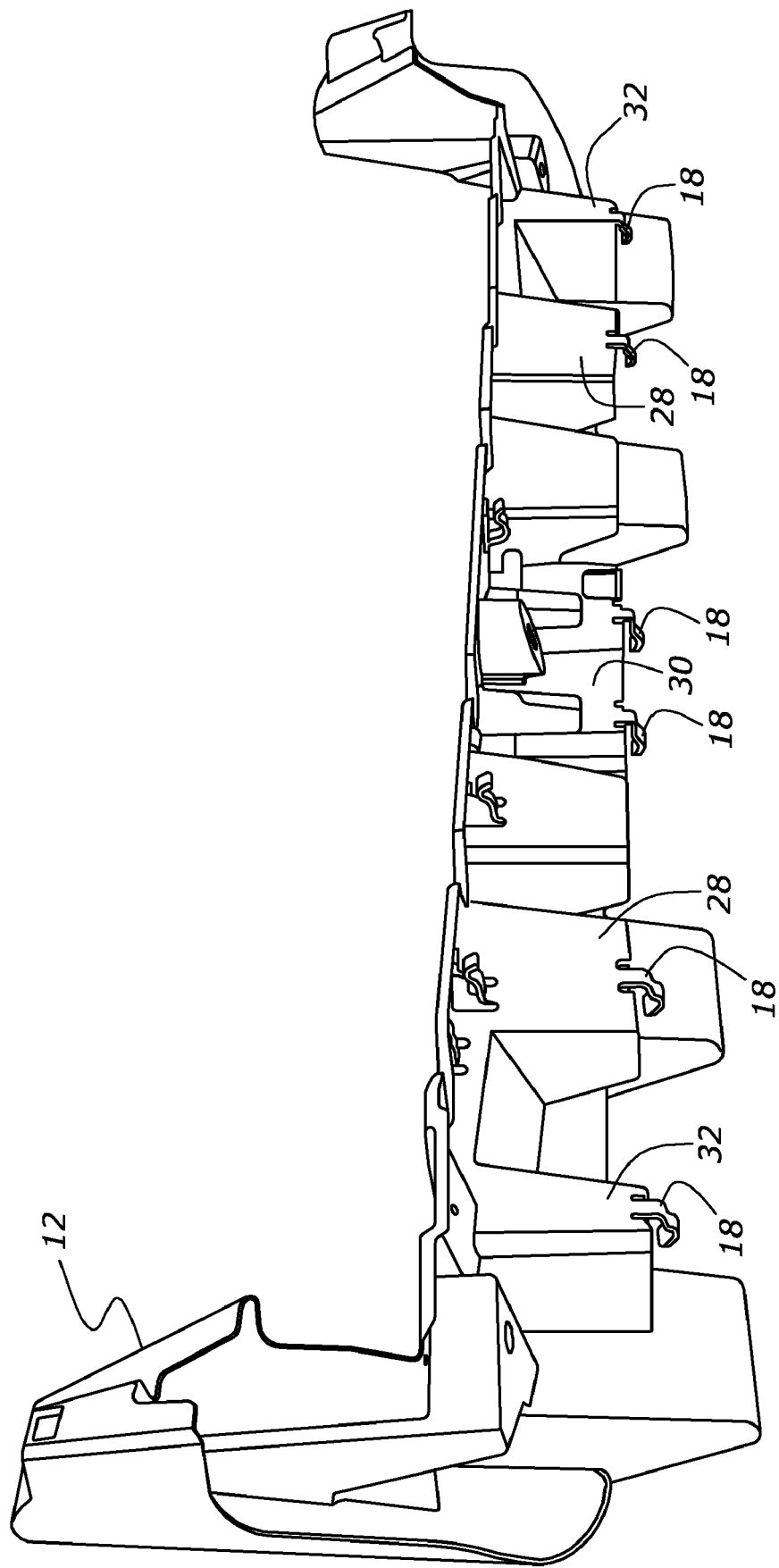
FIG. 2 is another isometric views of the isolator of FIG. 1, illustrating anti-rattle springs for supporting a bottom of a fascia, and illustrating the back of the isolator.
Figure 3:
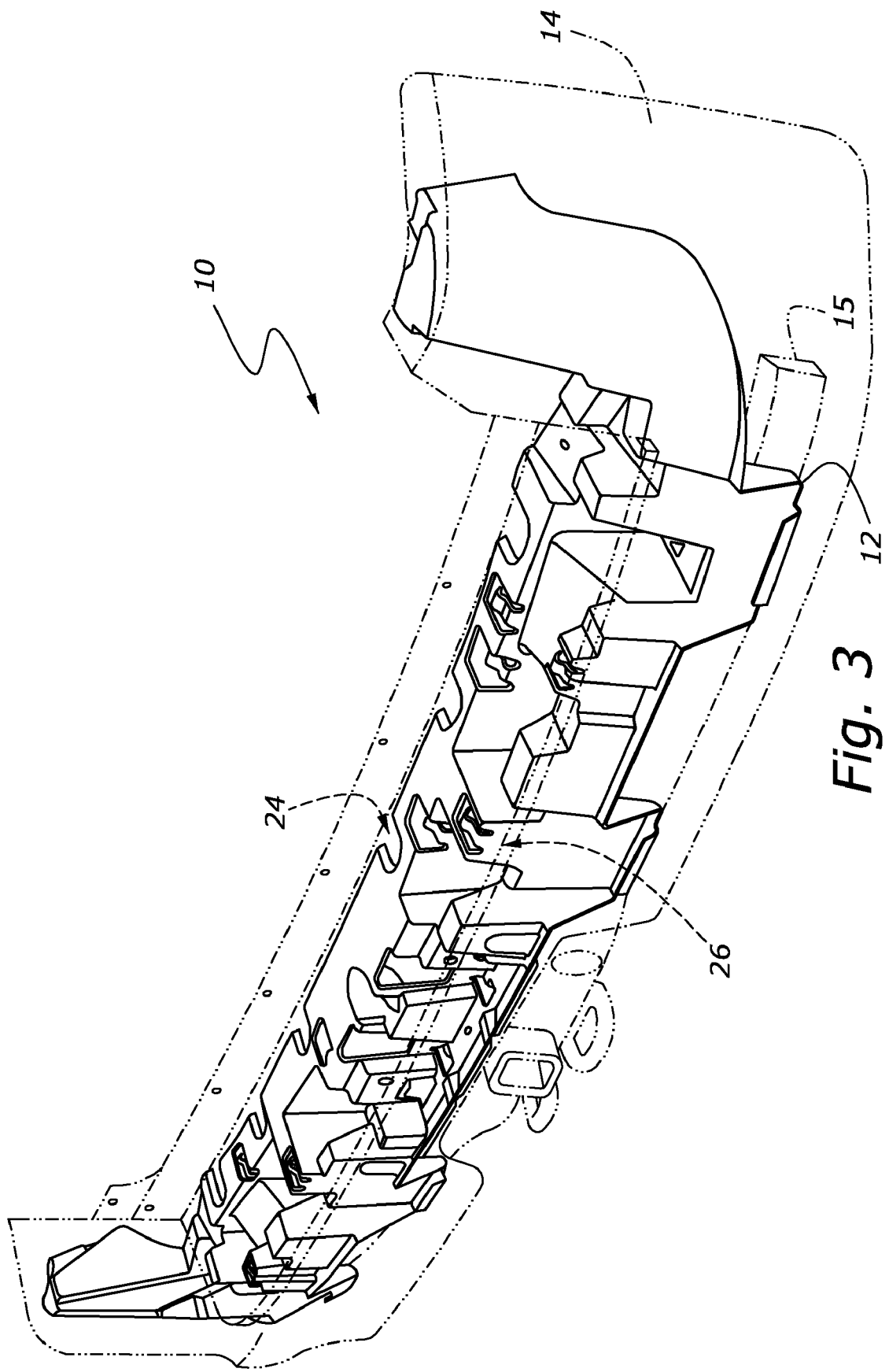
FIG. 3 is an isometric view of a fascia, shown in hidden, installed onto the isolator of FIG. 1.
Figure 4:
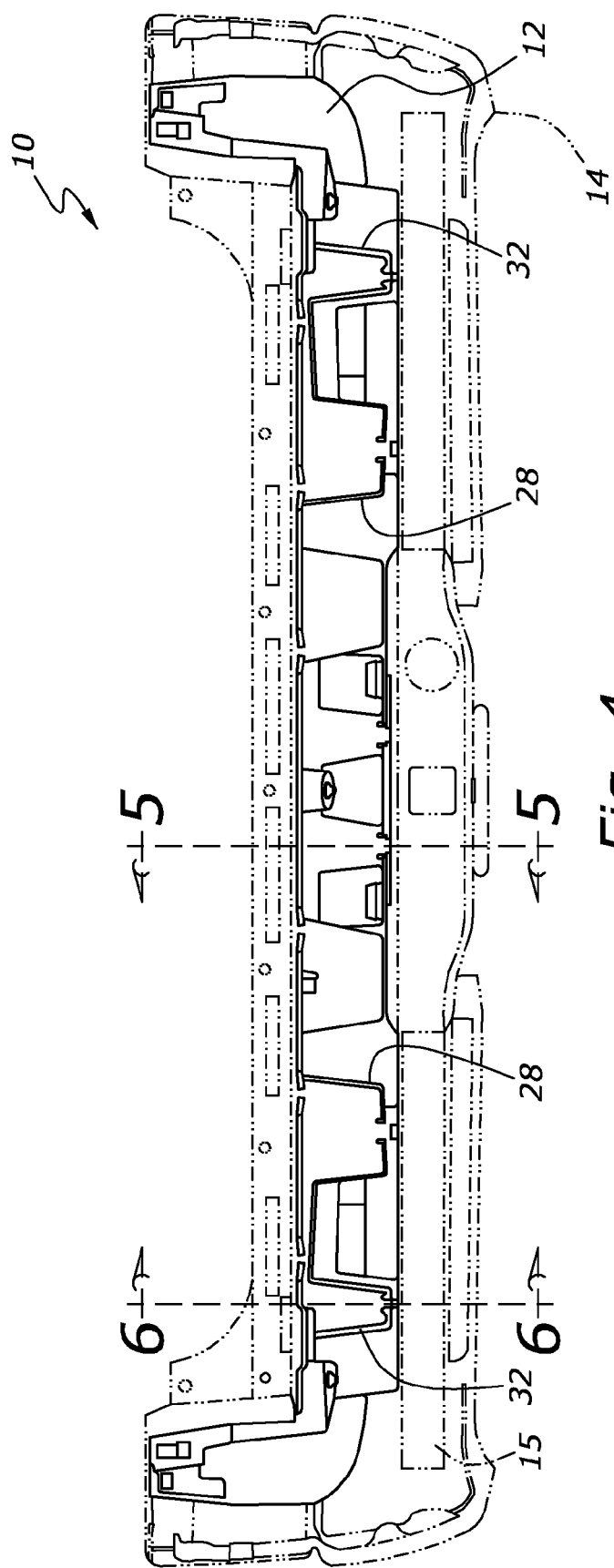
FIG. 4 is a front view of a fascia, shown in hidden, installed onto the isolator of FIG. 1.
Figure 5:
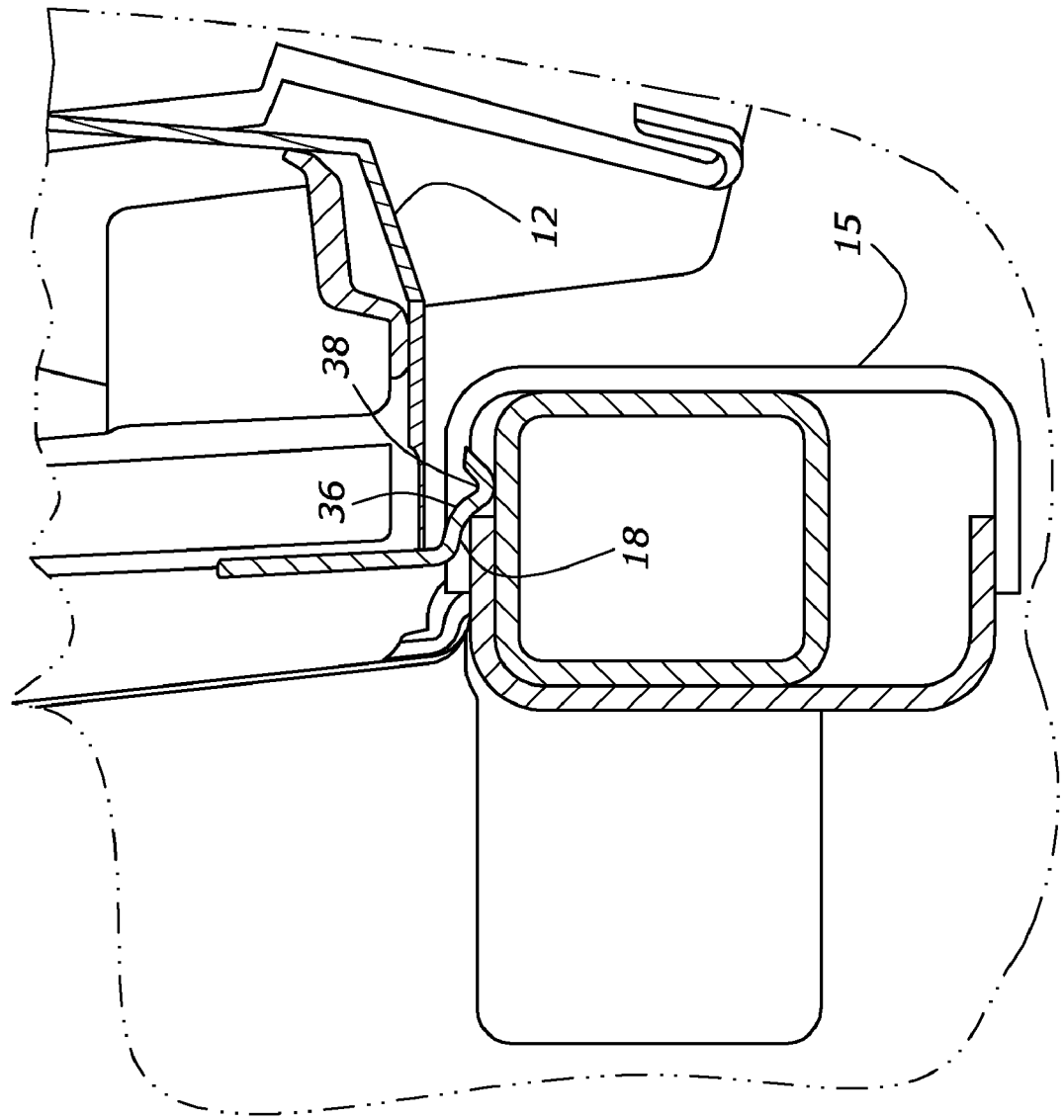
FIG. 5 is a cross-sectional view of an anti-rattle spring for preventing rattle of the isolator of FIG. 1 relative to a cross beam taken generally along line 5-5 in FIG. 4.
Figure 6:
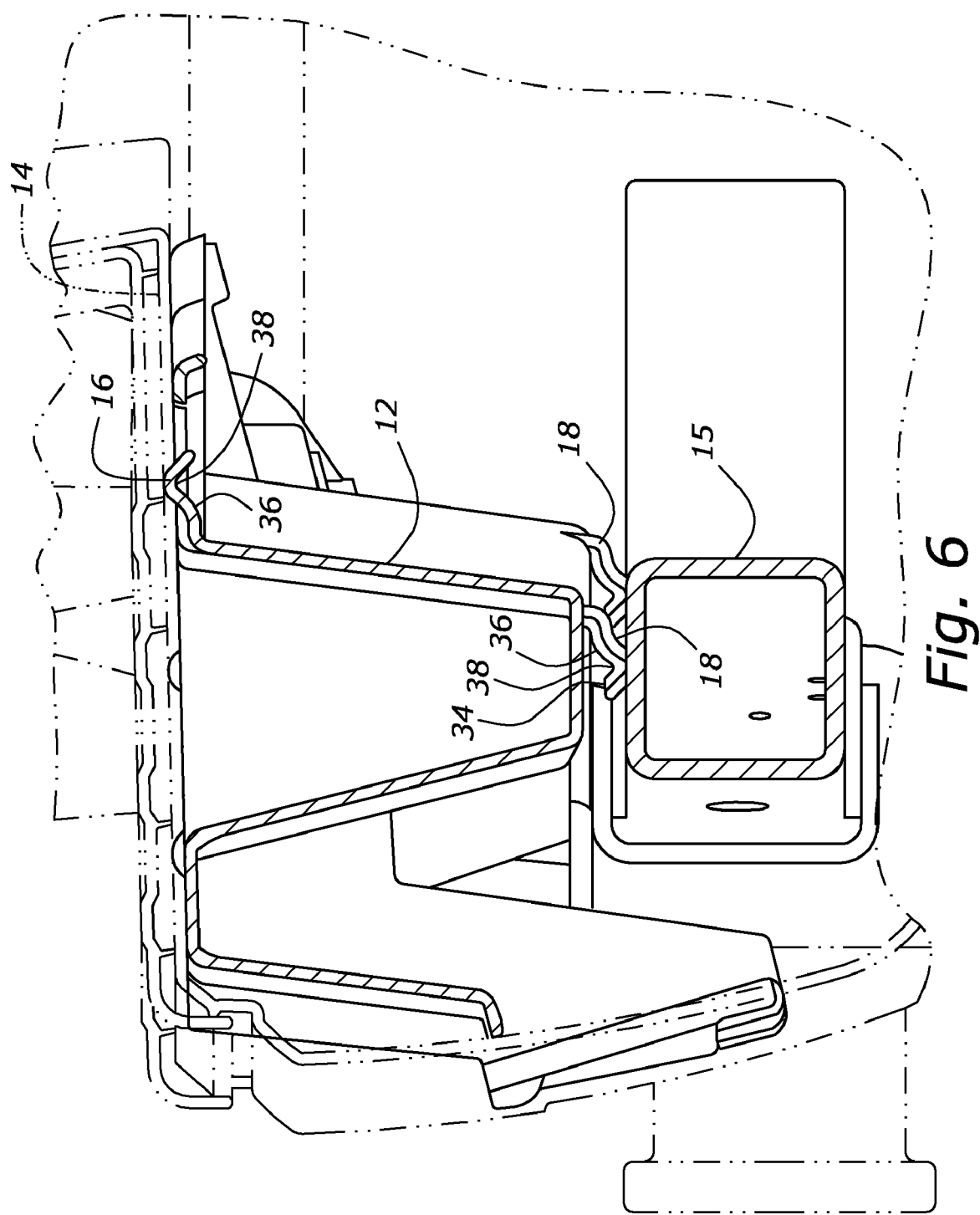
FIG. 6 is a cross-sectional view of an anti-rattle spring for preventing rattle of the isolator of FIG. 1 relative to a cross beam taken generally along line 6-6 in FIG. 4, and further, illustrative of an anti-rattle spring for preventing rattle of the fascia relative to the isolator, with the view of FIG. 6 being shown in the opposite direction compared to the view of FIG. 5.
Figure 7:
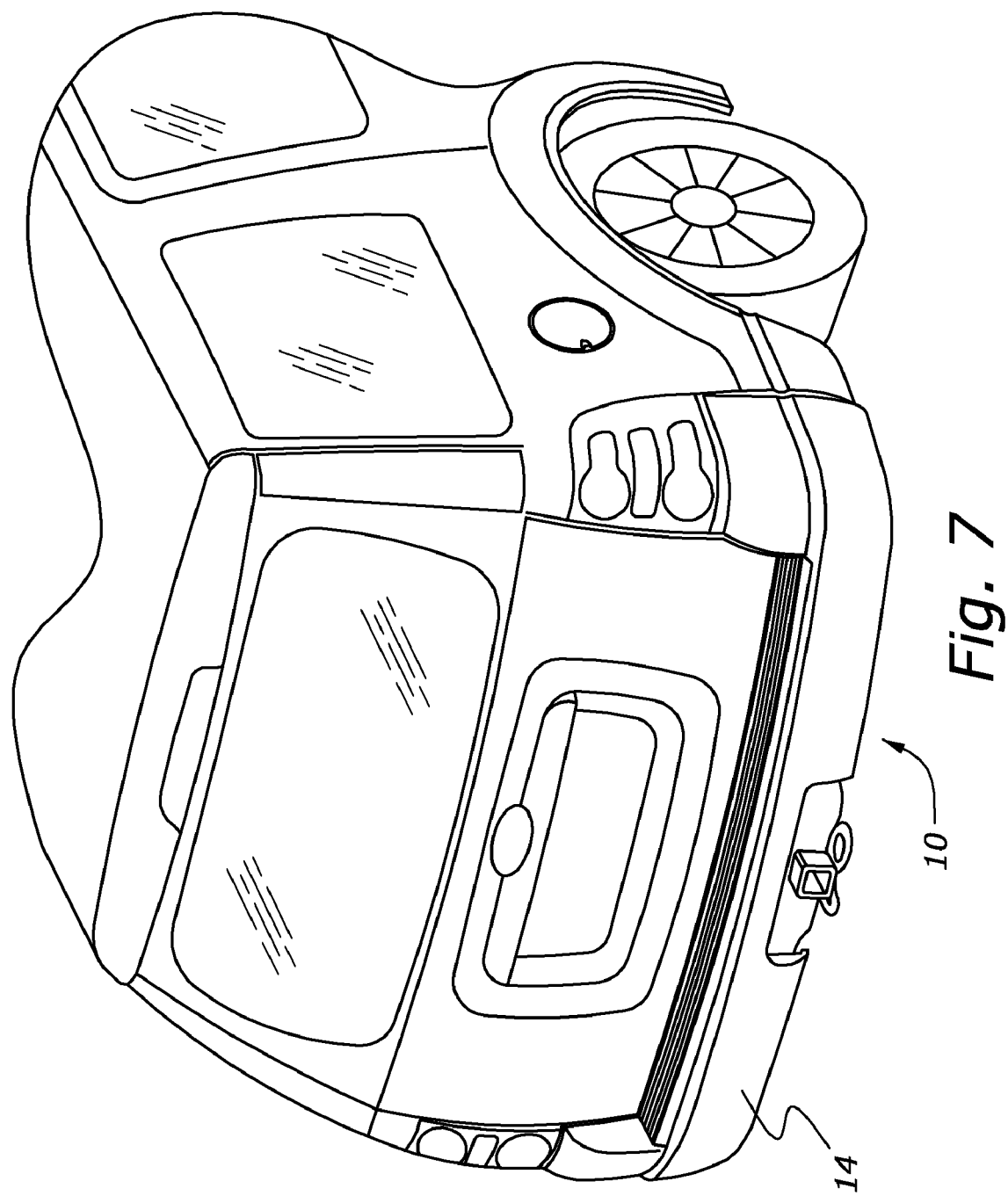
FIG. 7 is an exemplary view of the bumper system according to the present invention, installed onto an automobile.

Referring to FIGS. 1-7, bumper system 10 may generally include an isolator 12 for supporting a fascia 14, with isolator 12 being supported by cross beam 15 affixed to the vehicle frame in a known manner. Isolator 12 may include a plurality of fascia support anti-rattle springs 16 and cross beam support anti-rattle springs 18. Springs 16, 18 may be formed during manufacture of isolator 12 as PIA components and preferably uniformly positioned on the isolator for supporting fascia 14 or isolator 12 relative to cross beam 15, as illustrated in FIGS. 3, 5 and 6. Springs 16, 18 may be preferably molded with isolator 12 by direct molding into the mold tool (not shown), or if needed, affixed to isolator 12 by adhesive or other known bonding techniques.

As shown in FIGS. 1, 3 and 6, fascia support anti-rattle springs 16 may be provided on inboard and outboard support members 20, 22 for likewise supporting the inboard and outboard inner surfaces 24, 26, respectively, of fascia 14, and further biasing fascia 14 away from isolator 12. In a similar manner, as shown in FIGS. 2, 5 and 6, cross beam support anti-rattle springs 18 may be provided on beam support members 28, 30 and 32, and uniformly positioned on isolator 12 for supporting the isolator relative to cross beam 15, and further biasing isolator 12 away from crossbeam 15.

Referring to FIGS. 1, 2, 6 and 7, springs 16, 18 may include a lead-in section 34 for facilitating smooth assembly and relative movement of fascia 14 and cross beam 15. Springs 16, 18 may further include first and second detents 36, 38, with second detent 38 being an engagement detent for contacting fascia 14 or cross beam 15 as needed. First detent 36 may include a convex configuration as shown in FIGS. 5 and 6 for facilitating spring action of springs 16, 18 and for further facilitating positioning of springs 16, 18 in a predetermined configuration for respectively maintaining fascia 14 in a predetermined position relative to isolator 12 and isolator 12 relative to cross beam 15. Second detent 38 may include a concave configuration for providing a contact surface against fascia 14 or cross beam 15. The contact surface of detent 38 may be grained for improving contact between the springs and fascia 14 or cross beam 15.

To thus summarize, the present invention provides a bumper system which provides a cost-effective means for minimizing or eliminating rattling of components, such as fascia 14 and isolator 12. As readily evident to those skilled in the art, springs 16, 18 may be readily tunable to a variety of fascia and isolator designs, without requiring significant re-design of any of the aforementioned components.

Those skilled in the art would readily appreciate in view of this disclosure that various modifications could be made to the aforementioned components, without departing from the scope of the present invention. For example, whereas springs 16, 18 are shown on the top and bottom surfaces of isolator 12, springs 16, 18 may be provided at any desirable location on isolator 12 (i.e. sides) for biasing fascia 14 away from isolator 12 or isolator 12 away from another structure. Whereas springs 16, 18 are shown as being used with isolator 12, springs 16, 18 may be used on a variety of other components such as doors, roof areas etc. The thickness and overall configuration of springs 16, 18 may be determined or modified as needed based on the biasing requirement for a particular structure.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. An automobile bumper system comprising:
   an isolator disposed adjacent a cross beam of an automobile frame;
   a fascia disposed adjacent said isolator to substantially cover said isolator; and
   at least one fascia support anti-rattle spring mounted to said isolator and disposable in contiguous engagement with said fascia for maintaining said fascia adjacent said isolator in a fascia predetermined position and further biasing said fascia away from said isolator to said fascia predetermined position,
   wherein said fascia support anti-rattle spring includes an end mounted to said isolator and an engagement detent for contiguously engaging said fascia and thereby biasing said fascia away from said isolator to said fascia predetermined position.

2. An automobile bumper system according to claim 1, further comprising at least one cross beam support anti-rattle spring mounted to said isolator and disposable in contiguous engagement with said cross beam for maintaining said isolator adjacent said cross beam in an isolator predetermined position and further biasing said isolator away from said cross beam to said isolator predetermined position.

3. An automobile bumper system according to claim 1, wherein said fascia and cross beam support anti-rattle springs include a further detent between said engagement detent and said end mounted to said isolator for maintaining said fascia and cross beam support anti-rattle springs in a predetermined biased configuration respectively relative to said fascia and said cross beam.

4. An automobile bumper system according to claim 3, wherein said engagement and further detents respectively include concave and convex configurations.

5. An automobile bumper system according to claim 1, wherein said fascia support anti-rattle spring is integrally formed with said isolator.

6. An automobile bumper system according to claim 2, wherein said cross beam support anti-rattle spring is integrally formed with said isolator.

7. An automobile bumper system according to claim 1, wherein said fascia support anti-rattle spring is provided on an upper surface of said isolator for contiguously engaging said fascia.

8. An automobile bumper system according to claim 2, wherein said cross beam support anti-rattle spring is provided on a lower surface of said isolator for contiguously engaging said cross beam.

9. An automobile bumper system according to claim 1, wherein said fascia support anti-rattle spring includes a lead-in section for facilitating movement of said fascia relative to said isolator, said lead-in section being pointed in a direction away from a fascia biasing direction.

10. An automobile bumper system according to claim 2, wherein said cross beam support anti-rattle spring includes a lead-in section for facilitating movement of said isolator relative to said cross beam, said lead-in section being pointed in a direction toward an isolator biasing direction.

11. An automobile bumper system comprising:
    an isolator disposable adjacent a cross beam of an automobile frame;
    a fascia disposable adjacent said isolator; and
    at least one fascia support anti-rattle spring mounted to said isolator and disposable in contiguous engagement with said fascia for maintaining said fascia adjacent said isolator in a fascia predetermined position and further biasing said fascia away from said isolator to said fascia predetermined position,
    wherein said fascia support anti-rattle spring includes an end mounted to said isolator and an engagement detent for contiguously engaging said fascia and thereby biasing said fascia away from said isolator to said fascia predetermined position.

12. An automobile bumper system according to claim 11, further comprising at least one cross beam support anti-rattle spring mounted to said isolator and disposable in contiguous engagement with said cross beam for maintaining said isolator adjacent said cross beam in an isolator predetermined position and further biasing said isolator away from said cross beam to said isolator predetermined position.

13. An automobile bumper system according to claim 11, wherein said fascia and cross beam support anti-rattle springs include a further detent between said engagement detent and said end mounted to said isolator for maintaining said fascia and cross beam support anti-rattle springs in a predetermined biased configuration respectively relative to said fascia and said cross beam.

14. An automobile bumper system according to claim 13, wherein said engagement and further detents respectively include concave and convex configurations.

15. An automobile bumper system according to claim 11, wherein said fascia support anti-rattle spring is integrally formed with said isolator.

16. An automobile bumper system according to claim 12, wherein said cross beam support anti-rattle spring is integrally formed with said isolator.

17. An automobile bumper system according to claim 11, wherein said fascia support anti-rattle spring is provided on an upper surface of said isolator for contiguously engaging said fascia.

18. An automobile bumper system according to claim 12, wherein said cross beam support anti-rattle spring is provided on a lower surface of said isolator for contiguously engaging said cross beam.

19. An automobile bumper system according to claim 11, wherein said fascia support anti-rattle spring includes a lead-in section for facilitating movement of said fascia relative to said isolator, said lead-in section being pointed in a direction away from a fascia biasing direction.

20. An automobile bumper system according to claim 12, wherein said cross beam support anti-rattle spring includes a lead-in section for facilitating movement of said isolator relative to said cross beam, said lead-in section being pointed in a direction toward an isolator biasing direction.

21. An automobile bumper system comprising:
 an isolator disposable adjacent a cross beam of an automobile frame;
 a fascia disposable adjacent said isolator; and
 at least one cross beam support anti-rattle spring mounted to said isolator and disposable in contiguous engagement with said cross beam for maintaining said isolator adjacent said cross beam in an isolator predetermined position and further biasing said isolator away from said cross beam to said isolator predetermined position,
 wherein said cross beam support anti-rattle spring includes an end mounted to said isolator and an engagement detent for contiguously engaging said cross beam and thereby biasing said isolator away from said cross beam to said isolator predetermined position.

* * * * *